Figure 1:
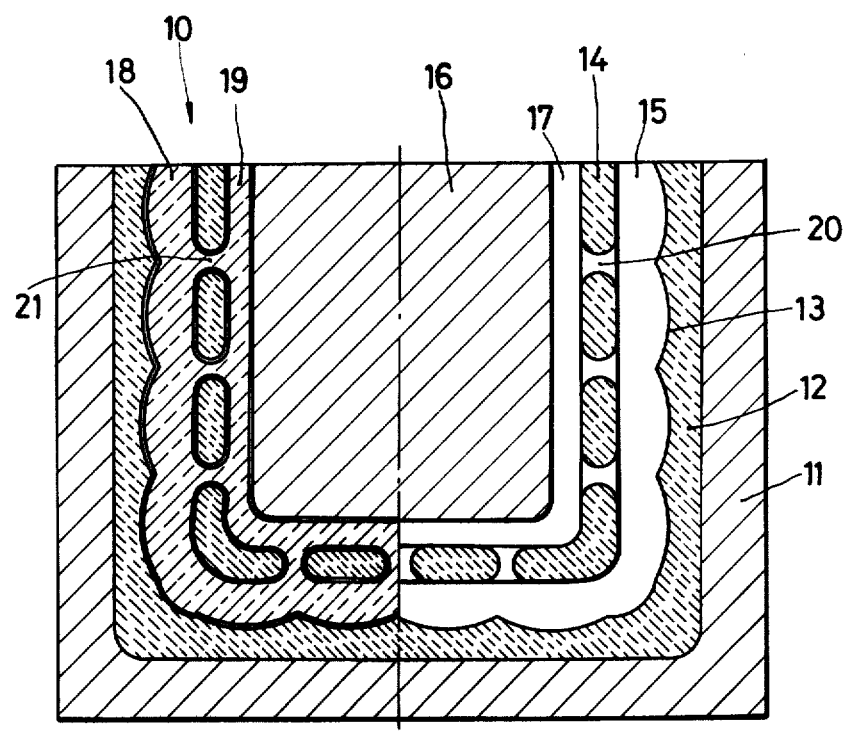

United States Patent [19]

Klepsch

[11] 4,288,238

[45] Sep. 8, 1981

[54] PROCESS AND MOULD FOR THE MANUFACTURE OF MULTI-WALLED HOLLOW BODIES, ESPECIALLY OF GLASS

[75] Inventor: Kristian Klepsch, Viechtach, Fed. Rep. of Germany

[73] Assignee: Klepsch Kunst GmbH & Co. KG Galerie, Viechtach, Fed. Rep. of Germany

[21] Appl. No.: 110,315

[22] Filed: Jan. 8, 1980

[30] Foreign Application Priority Data

Jan. 8, 1979 [DE]  Fed. Rep. of Germany ....... 2900429

[51] Int. Cl.³ ............................................. C03B 11/10
[52] U.S. Cl. ......................................... 65/23; 65/18; 65/68; 65/374 R; 65/374 M
[58] Field of Search ............ 65/18, 23, 68, 71, 374 R, 65/374 M

[56] References Cited

U.S. PATENT DOCUMENTS

| | | | |
|---|---|---|---|
| 301,329 | 1/1884 | Beck | 65/23 |
| 778,286 | 12/1904 | Thomson | 65/18 X |
| 1,368,958 | 2/1921 | Miller | 65/23 |
| 2,266,349 | 12/1941 | Wempe | 65/23 X |
| 3,770,405 | 11/1973 | DeAngelis et al. | 65/23 |

*Primary Examiner*—Arthur D. Kellogg
*Attorney, Agent, or Firm*—Sughrue, Mion, Zinn, Macpeak and Seas

[57] ABSTRACT

The manufacture of double-walled or multi-walled hollow bodies, especially of glass, is difficult in practice and entails great expense. According to the invention, the cavity formed between the walls of the hollow body is filled with auxiliary moulds or auxiliary mould parts which serve to mould the walls of the hollow body and which, after manufacture of the latter, can be removed from the cavities, especially by dissolving in a solvent, without destroying or even adversely affecting the hollow body.

15 Claims, 5 Drawing Figures

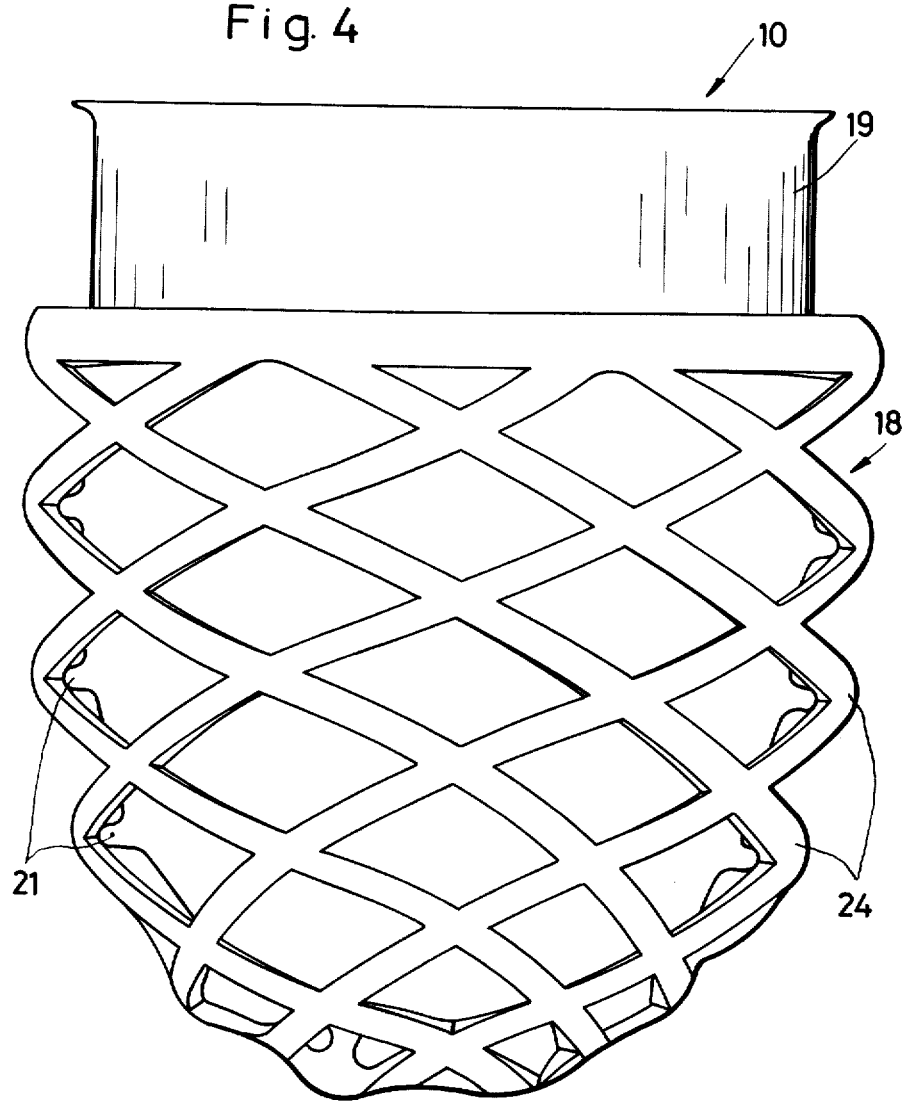

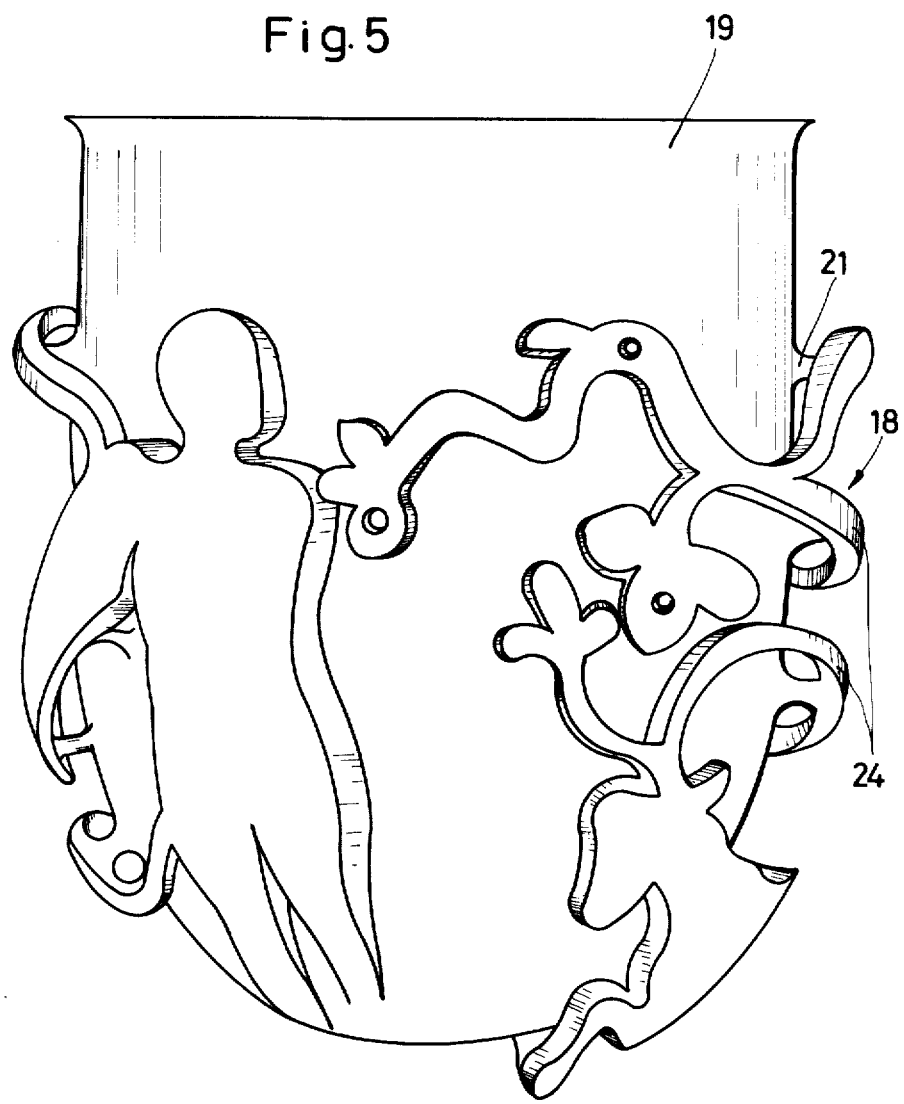

PROCESS AND MOULD FOR THE MANUFACTURE OF MULTI-WALLED HOLLOW BODIES, ESPECIALLY OF GLASS

The invention relates to a process for the manufacture of hollow bodies, having a plurality of walls or wall parts, separated from one another by cavities and connected to one another by webs or other bridges, from a material which can be cast and/or moulded at an elevated temperature, especially glass, using a mould into which the material is introduced in a mouldable state. In addition, the invention relates to a mould for the manufacture of such hollow bodies.

The manufacture of multi-walled hollow bodies from materials which become liquefied, or are mouldable, as a result of heating, but are relatively rigid, and may or may not be brittle, in the cold state, is a problem which in industry has found only unsatisfactory solutions. This applies especially to multi-walled hollow bodies made of glass, and in particular both to technical applications (equipment for chemical laboratories, and the like) and to art objects and to utensils. The double-walled construction of the hollow bodies can accordingly have technical reasons, but also design reasons and aesthetic reasons.

It is the object of the invention to propose a process and a device (mould), by means of which double-walled or multi-walled hollow bodies of the most diverse shape can be manufactured satisfactorily even from critical materials, for example glass.

To achieve this object, the process according to the invention is characterised in that the cavities are filled by a rigid, pressure-resistant auxiliary mould or auxiliary mould parts, which after the formation of the wall or of the wall parts is or are removed from the cavities by chemical or physical treatment.

Accordingly, an essential feature of the invention comprises auxiliary moulds or auxiliary mould parts which are suitable for being used once only, i.e. are suitable for the manufacture of a moulding (hollow body). During the manufacture of the hollow body, the auxiliary mould is located between the walls of the moulding and accordingly moulds the regions of the walls which face the auxiliary mould. The auxiliary mould enclosed between the walls of the hollow body after the latter has been produced is removed by chemical and/or physical treatment, in particular by dissolving the material of the auxiliary mould.

The process according to the invention can be employed particularly advantageously in the manufacture of hollow bodies made of glass. Plaster of Paris is a particularly advantageous material for the auxiliary moulds employed in that case. However, other materials, which can be cast or moulded before they harden, and which permit very simple production of the auxiliary mould and equally simple elimination of the latter from the cavities of the hollow body, are also conceivable. Plaster of Paris can be cast when producing the auxiliary mould and can therefore also assume surface structures, relief configurations and the like, which then produce a corresponding surface of the wall or wall parts of the hollow body. This is of particular interest in the artistic design of articles made of glass or the like. Furthermore plaster of Paris can very easily be removed from the cavities by dissolving it in a solvent, namely in an acid, without thereby causing damage to the surfaces of the hollow body. During the manufacture of the hollow body by shaping a hot, mouldable material, especially glass, the auxiliary mould is resistant to pressure and to the heat stresses which arise.

According to a further proposal of the invention, the auxiliary mould is provided with perforations through which the material of the hollow body passes, so that webs or other connections are moulded between the walls or wall parts.

Advantageously, the walls or wall parts are produced in successive production steps, with the wall which has first been produced being kept at an elevated temperature which allows bonding to the wall produced subsequently. Auxiliary moulds corresponding to the progress of the production process are introduced, in accordance with the number of walls or the number of cavities remaining between these walls, into the hollow body so that the multi-walled hollow body is built up layer by layer or wall by wall.

A mould according to the invention, for carrying out the process, namely for the manufacture of the hollow bodies, is characterised in that within a rigid outer mould, in particular made of metal, is located an auxiliary mould resting against the latter, and, at a distance from the auxiliary mould, yet a further auxiliary mould. Furthermore, an inner mould (mould core) can be located within the inner auxiliary mould and at a distance from the latter.

The material from which the hollow body is formed can be introduced in a variety of ways. A number of materials can be introduced hot, as liquids. This is also true of glass. However, this material can also be introduced in a comminuted state into the mould and then heated in the mould until it is capable of flow. Furthermore it is possible to introduce the mouldable or pourable materials into the cavities, which are to be filled, by additional application of pressure, for example in the case of glass also by conventional methods using a glass centrifuge.

Details of the process according to the invention and of appliances (moulds) are explained in more detail below in relation to the drawings.

Figure 2:
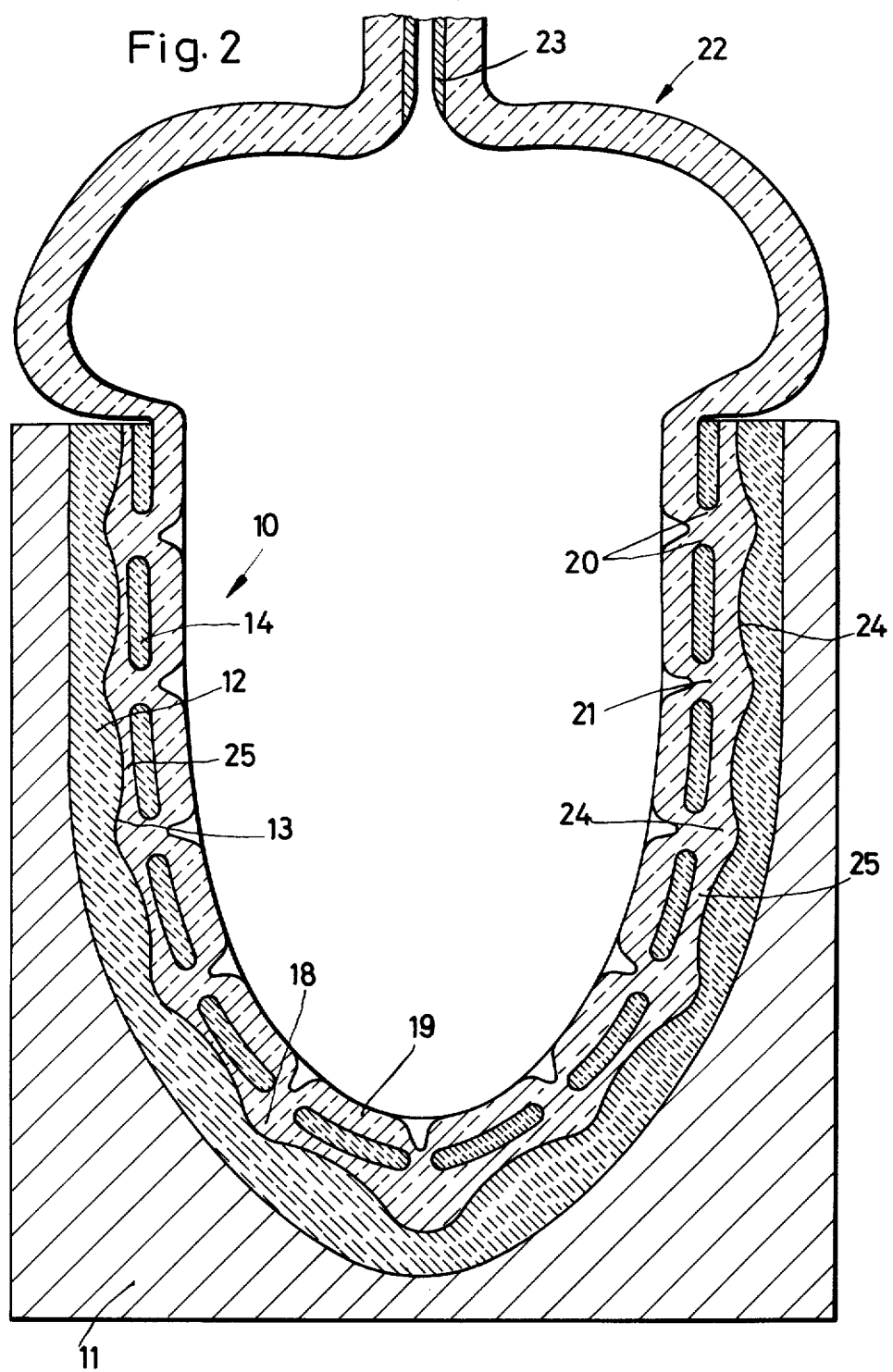
Figure 3:
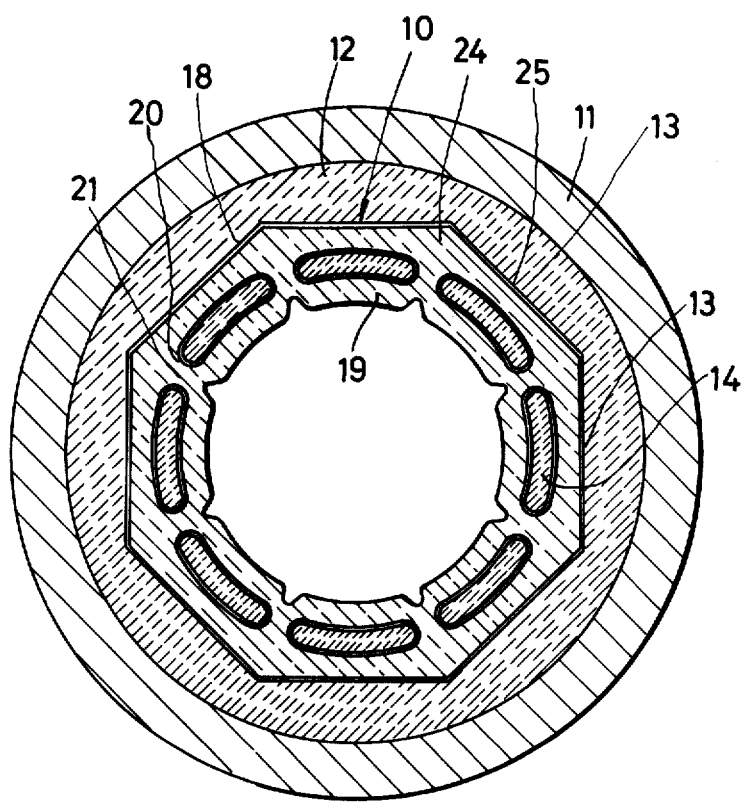

In the drawings:

FIG. 1 shows in vertical section, and greatly simplified, a mould for the production of a hollow body from, in particular, glass, FIG. 2 shows, again in vertical section, a mould having in principle the construction shown in FIG. 1, for a modified production process, FIG. 3 shows a horizontal section through the moulds according to FIGS. 1 and 2, FIG. 4 shows a hollow body, namely a glass vessel, in side view and FIG. 5 shows a further illustrative embodiment of a glass vessel, again in side view.

The illustrative embodiments of moulds, and of products manufactured therein, shown in the drawings relate in particular to the processing of glass as the material for producing the hollow bodies.

The mould, shown by way of example in FIG. 1, for the production of beaker-like vessels 10 consists of a rigid outer mould 11, which may for example also be made of metal. The said outer mould 11 is so constructed that it withstands mechanical and thermal stress.

To the inside of the beaker-shaped outer mould 11 is attached a first, outer auxiliary mould 12, which in the present case rests against the outer mould 11 over its entire surface. The inside of the auxiliary mould 12 is provided with a profile 13 or other shape which corresponds to the hollow body to be produced, namely the vessel 10.

A second, inner auxiliary mould 14 is located at a distance from the abovementioned first auxiliary mould 12. The distance from the latter is such that an appropriate beaker-shaped cavity 15 is formed. In the present example, the inner auxiliary mould 14 is provided with perforations 20.

Again at a distance from the second, inner auxiliary mould 14, a mould core 16 is provided as the inner mould and this accordingly also defines a beaker-shaped cavity 17 relative to the auxiliary mould 14.

The above-mentioned cavities 15, 17 (shown in the right-hand half of FIG. 1) are filled in a suitable manner with the material which is capable of flow, especially with glass, in such a way that the vessel 10, having an outer wall 18 and, at a distance from the latter, an inner wall 19, is formed. As a result of the perforations 20 in the auxiliary mould 14, connections between the outer wall 18 and the inner wall 19 are formed from the material constituting the vessel 10, and in particular are formed in the shape of webs 21.

After the vessel 10 consisting of two walls 18, 19 has been produced, the auxiliary moulds 12 and 14 must be removed from the vessel 10. This is done by chemical and/or physical treatment of the material of the auxiliary moulds. If plaster of Paris is used for these auxiliary moulds, the latter can be eliminated by means of a solvent, especially by means of acid, which is introduced into the cavities 15 and 17. The auxiliary moulds 12 and 14 are thereby totally eliminated.

The production process described above can also be modified in that, in a separate process step, only the outer wall 18 is first introduced into a cavity 15 delimited by an appropriate inner mould (mould core), and only thereafter is the inner auxiliary mould 14 inserted into the outer wall 18. Thereafter, the inner wall 19, with webs 21, is produced in the manner which has been described. Whilst doing so, the material of the outer wall 18 is kept at an elevated temperature which allows the webs 21, produced in the second process step, to bond to this outer wall 18.

In the illustrative embodiment of FIG. 2, a similar mould construction is employed in principle. Here, however, the inner wall 19, including the webs, is produced from a prefabricated hollow glass body 22 (a so-called parison) and is moulded against the inside of the inner auxiliary mould 14 by blowing through a blow tube 23. By using an appropriate blowing pressure, the webs 21 are at the same time forced through the perforations 20.

In the illustrative embodiments shown, the profile 13 of the first, outer auxiliary mould 12 is so chosen that thickened portions of material 24 are formed in or on the mouldings in the region adjacent to the webs 21. In comparison, the areas 25 between these are thin-walled. In the finished product the thickened portions of material 24 form, for example, a cross-hatch of ribs (FIG. 4), whilst the material in the region of the thin-walled areas 25 is forced out or removed by grinding. This produces, for example, a moulding according to FIG. 4.

However, the use of appropriate production processes for the auxiliary moulds 12 and 14 also makes other designs feasible, for example designs wherein wall regions or wall parts with a special geometrical shape, including a special surface shape, form the outer wall 18 of the vessel, whilst the inner wall 19 is a continuous beaker shape or other shape. FIG. 5 shows such an embodiment. The outer wall 18 consists of individual figures which are separated from one another by appropriate auxiliary moulds and which—if the auxiliary moulds have a surface profile—can exhibit special surface structures on both sides.

The auxiliary moulds, for example made of plaster of Paris, can be produced by processes which are in themselves known, for example by the use of blank moulds produced from mouldable materials. Silicone rubber is a possible mouldable material. This material for example also makes it possible to mould figures, for instance artistic three-dimensional figures, and to produce a corresponding rigid auxiliary mould, for example consisting of plaster of Paris, by introducing this material into the blank mould. The latter is then removed, so that an auxiliary mould corresponding to the original to be reproduced has been obtained.

The auxiliary mould can furthermore be filled with materials of different composition, especially of different colour, to produce the outer wall 18 and the inner wall 19. It is also possible to introduce articles, figures and the like made of other materials, for example pieces of metal, into the auxiliary mould and fix them to the latter in such a way that they form a firm bond with the outer wall 18 and/or inner wall 19 of the vessel 10.

When using auxiliary moulds made from plaster of Paris, it is advantageous to use a mixture of plaster of Paris and chalk with embedded reinforcement, especially with embedded glass fibres. This material, and the auxiliary mould produced therefrom, can easily be eliminated in the manner described, except for the reinforcement, which issues from the hollow body together with the liquid solvent. Using the above-mentioned composition, the auxiliary mould is particularly resistant to mechanical stresses.

The formation of structures, profiles and the like on the surface of the auxiliary moulds ensures that a very wide range of shapes of mouldings is feasible. Thus it is thereby possible to make the areas 25 relatively thin-walled, as a result of which subsequent finishing (grinding) of the outer wall 18 is facilitated. Furthermore it is thus possible to provide the walls 18 and 19 with design structures, namely three-dimensional structures, in inaccessible regions, for example on the inside of the outer wall 18.

I claim:

1. A molding process for the production of a hollow vessel from a meltable casting material such as glass, said vessel having at least two walls spaced apart and joined together by a plurality of lateral webs, comprising the steps of:
   (a) positioning a first destructable hollow auxiliary mode form (14) having a plurality of lateral passages (20) extending therethrough within a hollow outer mold (11) but spaced therefrom to define an outer wall chamber (15) therebetween,
   (b) introducing said casting material into said outer wall chamber, said lateral passages, and over the inner surface of said auxiliary mold form,
   (c) hardening said casting material to define a unitary hollow vessel having an outer wall (18) and an inner wall (19) spaced therefrom but connected thereto by a plurality of webs (21) formed within said lateral passages, and
   (d) chemically dissolving said auxiliary mold form.

2. A process as defined in claim 1, further comprising:

(a) initially positioning a second destructable hollow auxiliary mold form (12) within the outer mold and in intimate contact therewith but subsequently spaced from and surrounding said first auxiliary mold form, and (b) simultaneously chemically dissolving said first and second auxiliary mold forms after said introducing and hardening steps.

3. A process according to claim 2, wherein the auxiliary moulds consist of a material which is resistant to heat and pressure and which is dissolved by an acid or an alkali.

4. A process according to claim 3, wherein the auxiliary moulds consist of plaster of Paris.

5. A process according to claim 4, wherein the casting material is glass, and it is introduced into the mould in a molten state.

6. A process according to claim 4, wherein the casting material is introduced into the mold in a comminuted state, and is heated in the mold until liquefied.

7. A process according to claim 4, wherein the casting material is introduced in the mouldable state into the interior of the first auxiliary mould and is expanded against the auxiliary moulds by the application of pressure, for example by centrifuging or by compressed air.

8. A process according to claim 7, wherein the outer wall and inner wall are produced successively, the outer wall being first produced and kept at an elevated temperature which allows the bonding of the webs produced as part of the subsequently moulded inner wall.

9. A process according to claim 2, wherein an inner mould core (16) is positioned within but spaced from the first auxiliary mold before the casting material is introduced.

10. A process according to claim 2, wherein the walls are produced from a pre-moulded hollow glass parison (22) and are moulded by blowing.

11. A process according to claim 2, wherein thin regions (25) of the outer wall are removed after manufacture by grinding.

12. A process according to claim 2, wherein prefabricated parts, for example of metal, are introduced into the mould and are bonded to the vessel walls.

13. A mold assembly for the production of a hollow vessel from a meltable casting material such as glass, said vessel having at least two walls spaced apart and joined together by a plurality of lateral webs, comprising:

(a) a rigid hollow outer mold (11), (b) a first destructable hollow auxiliary mold form (12) disposed within the outer mold and in intimate contact therewith throughout, and (c) a second destructable hollow auxiliary mold form (14) disposed within said first auxiliary mold form but spaced therefrom to define an outer wall chamber therebetween, (d) said second auxiliary mold form having a plurality of lateral passages extending therethrough.

14. A mold assembly as defined in claim 13, wherein portions of the second auxiliary mold form extend outwardly into engagement with the first auxiliary mold form to delimit the outer wall chamber.

15. A mold assembly according to claim 13, further comprising a removable inner mould core (16) disposed within and spaced from the second auxiliary mould form to define an inner wall chamber therebetween.

* * * * *